United States Patent Office 3,262,032
Patented July 19, 1966

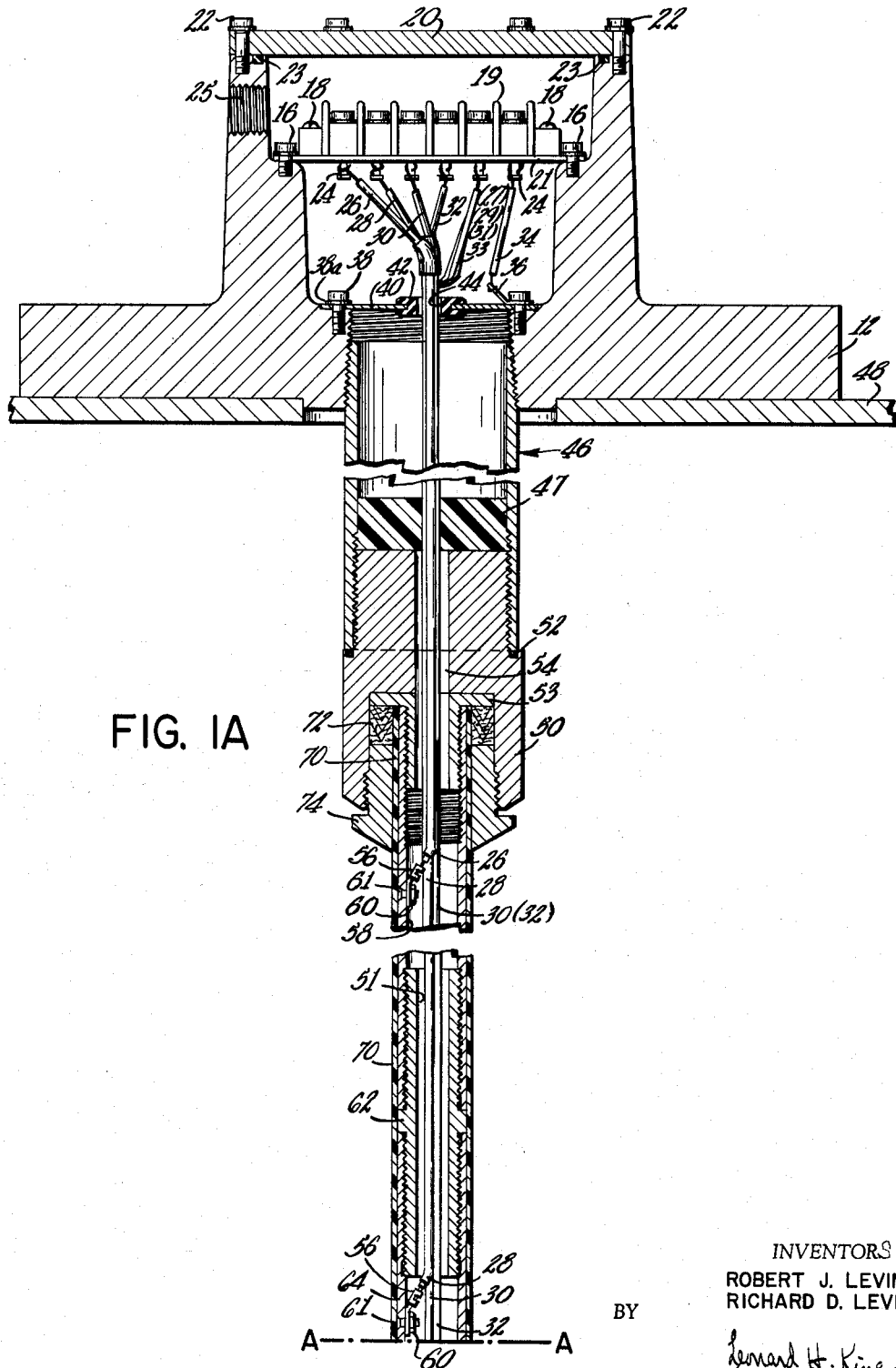
FIG. IA
INVENTORS
ROBERT J. LEVINE
RICHARD D. LEVINE
BY Leonard H. King
ATTORNEY

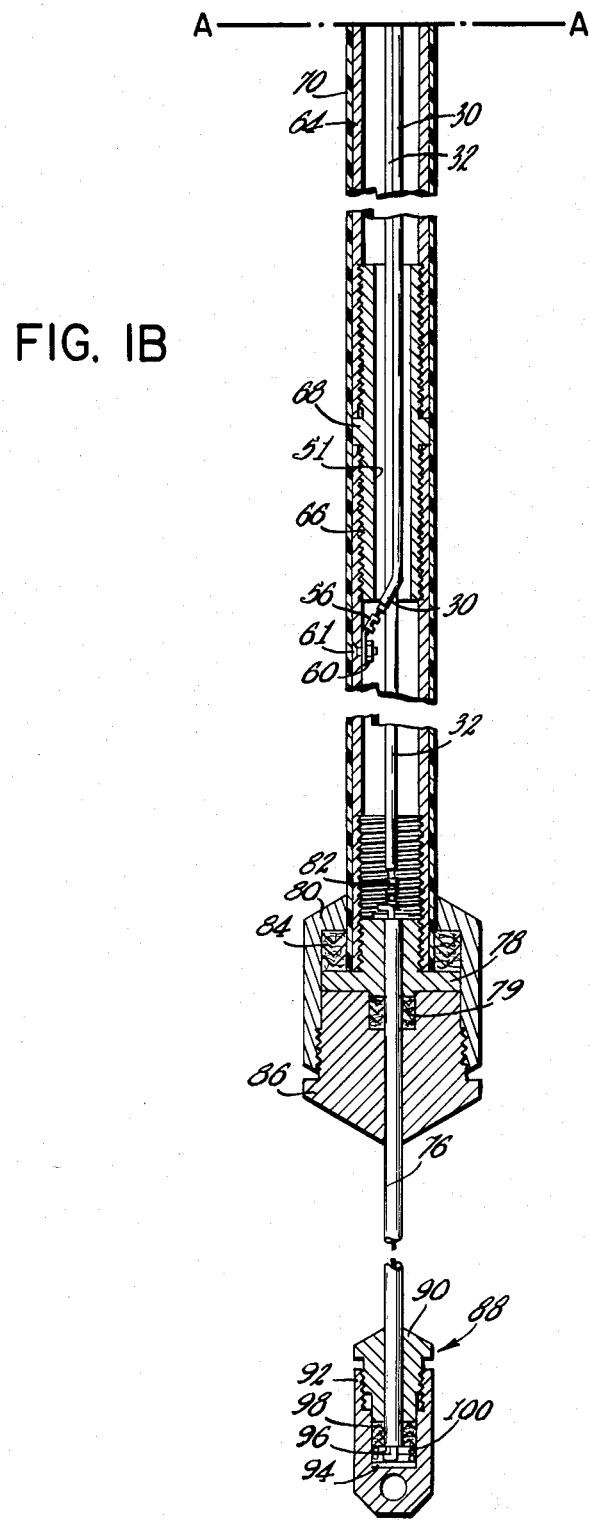
FIG. IB

3,262,032
CAPACITANCE TYPE, DEPTH MEASURING APPARATUS FOR CONDUCTIVE LIQUIDS
Robert J. Levine, Briarcliff Manor, and Richard D. Levine, Purdys, N.Y., assignors to Magnetic Instruments Co. Div. of Polymetric Devices Co., Inc., Jenkintown, Pa.
Filed Apr. 1, 1964, Ser. No. 356,496
24 Claims. (Cl. 317—246)

This invention relates to capacitive measuring probes and in particular to capacitive probes of long length suitable for the measurement of the depth of conductive liquids, and a method of assembling the probes.

In the installation of long capacitive probes for the measurement of liquid levels, various problems arise due to the length, weight and rigidity of the probes. The probes utilized may comprise a plurality of sections, each an independent capacitive element, but enclosed by a unitary casing; but as far as is known, only single section probes have been employed to date. The complete probes are comparatively long, 40 feet or more, and difficult to handle; and in addition, the single section probes are not capable of gaging a liquid level over a wide range with sufficient accuracy to give precise readings. Thus, when it is desired to use such a probe, it will be appreciated that shipping to the site of installation requires extra care and large hauling vehicles which, in turn, increase the cost. In addition, it can be understood that the installation in a ship, for example, presents difficulties in handling and positioning when the long length of the probe is considered. Maneuvering a rigid probe of these lengths, especially in close quarters, is exceedingly difficult and indeed, under some circumstances, practically impossible. Furthermore, any servicing of the probe would require removing the complete unit, again a formidable task considering the length, weight and rigidity of said probe.

The present invention obviates many of the difficulties inherent in the probes described hereinabove by providing a probe which can be conveniently field assembled, and whose overall gaging accuracy is increased by sectioning. Furthermore, the probe can be taken apart, to afford an easy means for troubleshooting and maintaining the probe and still retain the necessary watertight condition of the unit when it is reassembled. This is accomplished in part by providing a flexible Teflon tube which may be blown up into shape and slipped over the capacitive probe, mechanically stretched over the probe, or fitted onto the probe in any other convenient manner. Thus, ease of assembly, and removal is assured. In addition, a portion of the probe is constructed of a material sufficiently flexible to enable the assembled probe to be easily maneuvered and the thickness of the Teflon employed in the construction of the probe may be selected so as to obtain readings of the accuracy required.

It is an object of this invention therefore to provide a multisection capacitive probe.

It is another object of the present invention to provide a capacitive probe employing a covering of insulating material such as Teflon.

It is a further object of this invention to provide a capacitive probe that may be easily and conveniently assembled or taken apart.

It is still a further object of the present invention to provide a capacitive probe more maneuverable during installation or maintenance.

It is another object of this invention to provide a probe capable of several differing degrees of level gaging accuracy, the differing degrees being obtained by use of a plurality of sections, each designed for a specific accuracy.

These and other objects of the present invention will, in part, be pointed out with particularity and will, in part, be apparent from the following more detailed description of the invention taken in conjunction with the accompanying drawing which forms an integral part thereof.

In the various figures of the drawing, like reference characters designate like parts.

In the drawing:
FIG. 1A is a vertical cross section of one portion of the apparatus of the present invention.
FIG. 1B is a vertical cross section of the remainder of the apparatus of this invention.

In the drawing, the numeral 10 indicates generally the apparatus of the present invention. A flanged junction box 12 forms an enclosure inside of which there is positioned a barrier type terminal strip 19 secured by screws 18 to mounting plate 21 which, in turn, is fastened to junction box 12 by screws 16. Cover 20, held in place by screws 22, allows convenient access to terminal strip 19. O-ring 23 insures a liquid-tight assembly of cover 20. Lugs 24 provide for electrical connections to be made to shielded wires 26, 28, 30, 32, their shields 27, 29, 31 and 33 and ground lead 34, which is electrically connected to lug 36. Screws 38 and lock washers 38a serve to hold feed-through plate 40 in place. A rubber grommet 42 fits into plate 40 defining aperture 44 through which are run the shielded leads from the various sections of the capacitive probe.

Extension assembly 46 is threaded into flanged junction box 12 which, in turn, is secured to plate 48 which is representative of the structure into which the apparatus is installed. Top fitting 50 mates with extension assembly 46 and O-ring 52 insures a leakproof seal. Clearance hole 54 provides a means of routing through the fitting for shielded wires 26, 28, 30 and 32 which electrically connect the various sections of the probe to terminal strip 19. Flexible silicone based resin 47, such as Sylgard No. 182, forms a secondary leakproof seal for the shielded wires.

The upper sections of the probe consist of individual aluminum tubes 58, 64 and 66 which are joined mechanically to one another by threaded couplers 62 and 68 made from insulating material. Electrical connection is made to each probe section via shielded leads 26, 28 and 30, respectively for probe sections 58, 64 and 66. Each shielded lead center conductor terminates in a terminal lug 56 which is secured to its respective probe by screw 61 and nut 60. The shields of wires 26, 28 and 30 are unterminated or purposely open circuited at the point of probe connection to the center conductor.

In the assembling process lower rigid probe section 66 is connected to shielded wire 30 using screw 61 and nut 60. Wires 30 and 32 are fed through probe coupler 68 and probe coupler screwed into probe section 66. Wire 32 (for subsequent connection to the lowermost flexible probe section 76) is left dangling from both ends of probe section 66. Wires 30 and 32 are fed through probe section 64 which is screwed onto coupler 68. Wire 28 is then connected to probe section 64. Next, wires 28, 30 and 32 are fed through probe coupler 62 and the coupler screwed into probe section 64.

The rigid sections of the probe are assembled in this manner until all rigid sections are joined. At the lower end of the multisection assembly, wire 32 will be left unconnected and at the upper end of wires 26, 28, 30 and 32 will be awaiting subsequent connection.

At this point, Teflon tubing 70, in its packaged, flattened condition, is inflated by any convenient air compressor or mechanically stretched into position. The closed end portion is cut off and the tube is fitted easily over the three connected probe sections, the open ends of tube 70 permitting the unconnected wires to hang through. Tubing 70 is then heated by a blowtorch or other suitable means to shrink fit said tube around the probe sections. It will be noted that the capacitance per unit length of the probe section is dependent upon the thickness of the Teflon tubing. Thus, different degrees of capacitance can be tailor-made to suit gaging sensitivity and accuracy requirement.

After the Teflon tubing 70 has been installed on the rigid multisection probe, packing nut 74 and "V" packing 72 are slid over the upper end of the probe and at this point the Teflon tubing 70 is trimmed square. Next, top retainer 53 is loosely inserted over wires 26, 28, 30 and 32 into the upper end of the multisection probe. Reducing coupler 80 and "V" packing 84 are next slid over the lower end of the multisection probe and the Teflon tubing 70 trimmed square.

Packing nut 86 and "V" packing 79 are placed over the end of flexible Teflon-covered wire 76 which forms the bottom section of the probe. The insulation is removed from the end of wire 76 which is fed through coupler retainer 78. Wire 76 is crimped to the center conductor of wire 32, the shield of wire 32 being cut back so that it is left unterminated at the crimp. The coupler retainer is inserted in the end of probe section 66, the slack in wire 32 being taken up by pulling on wire 32 at the upper end of the probe section 58. Packing nut 86 is then screwed firmly into reducing coupler 80 making a leakproof seal.

The open end of wire 76 is inserted through packing nut 90 and "V" packing 98. From the end of wire 76, insulation is removed, the wire passed through pad 96 and coiled flat at a right angle to its length to a size suitable to fit inside O-ring 100. Packing nut 90 and the end of wire 76 are then inserted into the probe bottom fitting 92, the packing nut being tightened to make a leakproof seal.

Wires 26, 28, 30 and 32 are routed through the clearance hole 54 and extension assembly 46 with feedthrough plate 40 left temporarily unsecured. Upper probe section 58 with top retainer 53 is inserted into top fitting 50 and packing nut 74 tightened to form a leakproof seal. The rigid upper multisection probe is held vertical and a flexible silicone resin sealing compound 47, such as Sylgard No. 182 Resin, added to form a secondary seal. Wires 26, 28, 30 and 32 are fed through rubber grommet 42 previously installed in feedthrough plate 40. Plate 40 is secured with screws 38 and washers 38a to flange junction box 12. Screws 16 and washers 16a are removed, terminal strip 19 and mounting plate 21 turned so that wires 26, 28, 30, 32, and their respective shields 27, 29, 31, and 33 and ground wire 34 can be soldered to lugs 24. Terminal strip 19 and mounting plate 21 are fastened in place with screws 16 and washers 16a. Applicable connections to cooperating equipment are made at terminal strip 19 via access hole 25. Cover plate 20 is secured with screws 22, lock washers 22a and O-ring 23 making a seal.

It is to be noted that because of the flexibility of Teflon wire 76, the bottom 28-foot section, which is much longer than the rigid upper three sections, totaling 12 feet, can be bent around corners or over obstacles and generally gives the overall probe 10 much more maneuverability in installation and servicing than the rigid 40-foot (or longer) probes previously employed in the art. In addition, the last section is less expensive to construct than the rigid sections such as are used in the upper portion of the probe, while the 28-foot flexible section is not capable of giving as high a liquid gaging accuracy as the rigid section, it may be used where extreme gaging accuracy is not as important. For example, it may be used in the bottom portion of the liquid container and the more accurate sections near the top where exact measurements are needed so as to avoid overloading or underloading the tank.

In some instances, critical measurements will be required from the bottom portion of the tank into which the probe is inserted. For an eventuality such as this, the relative positions of the flexible section and the more rigid sections of the probe described hereinabove are reversed.

In the event that discrete capacitance steps are not required than connecting members 62 and 68 may be formed of metal so that electrically there is a single conductive element. The advantages of on site assembly of a long probe shipped in small sections are still preserved. The long single probe section is frequently desired where it is necessary to provide a non-linear scale to achieve improved accuracy in reading.

It can be appreciated from the foregoing, therefore, that a quick and convenient means and method is provided for assembling and installing a long multisection probe. The probe can be assembled at the installation site and can be repaired in the field if required.

There has been disclosed heretofore the best embodiment of the invention presently contemplated and it is to be understood that various changes and modifications may be made by those skilled in the art without departing from the spirit of the invention.

What is claimed is:

1. A capacitive probe for measuring the depth of a conductive liquid comprising:
   (a) a plurality of separate, electrically conductive probe sections;
   (b) connection means interposed between pairs of said probe sections to releasably join said probe sections in a particular sequence;
   (c) a single length, electrically non-conductive casing enclosing said probes in the assembled condition in a tight fitting relationship; and
   (d) an electrically conductive lead having one end secured to each said probe sections.

2. The apparatus of claim 1 wherein said probe sections are rigid, hollow tubular members said sections being threadably connected to each other by said connection means.

3. The apparatus of claim 1 including a plurality of rigid probe sections and one flexible probe section.

4. The apparatus of claim 1 wherein said casing is deformable.

5. The apparatus of claim 1 wherein said probe sections are of different lengths.

6. The apparatus of claim 1 including clamping means arranged to retain said casing in tight fitting relationship about the ends of said probe sections in the assembled condition.

7. Apparatus to measure the depth of a conductive liquid in an enclosure comprising:
   (a) a junction box adapted for attachment to the outside of the liquid containing enclosure;
   (b) a capacitive probe adapted to measure the depth of the liquid in the enclosure, said probe being secured to and downwardly depending from said junction box whereby said probe is at least partially immersed in the liquid, said probe being comprised of a plurality of separate, electrically conductive sections;
   (c) connection means interposed between pairs of said probe sections to releasably join said probe sections in a particular sequence;
   (d) a single length, electrically non-conductive casing enclosing said probes in the assembled condition in a tight fitting relationship;
   (e) an electrically conductive lead having one end secured to each of said probe sections;
   (f) coupling means securing said probe to said junction box; and
   (g) sealing means disposed about the terminal portions of said probe intermediate said probe and the liquid.

8. The apparatus of claim 7 wherein said probe sections are rigid, hollow tubular members, said sections being threadably connected to each other by said connection means.

9. The apparatus of claim 7 including a plurality of rigid probe sections and one flexible probe section.

10. The apparatus of claim 7 wherein said casing is deformable whereby said casing may be fitted over said probe sections in the assembled condition.

11. The apparatus of claim 7 wherein said probe sections are of different lengths.

12. The apparatus of claim 7 including clamping means arranged to retain said casing in tight fitting relationship about the ends of said probe sections in the assembled condition.

13. The apparatus of claim 7 including terminal means secured within said junction box, the ends of said conductive leads opposite said ends secured to said probe sections being secured to said terminal means whereby connection may be made to an external liquid level indicating device.

14. The apparatus of claim 7 wherein said coupling means is a sleeve threadably secured to both said junction box and to one end of said probe.

15. The method of assembling a multi-sectional capacitive probe comprising the steps of:
   (a) electrically connecting a shielded wire to each of a plurality of electrically conductive rigid tubes;
   (b) coupling the tubes together in end to end relationship to form an axially elongated unitary structure;
   (c) passing the shielded wires through the common bore of the assembled tube whereby all of the wires emanate from one end of the assembled tubes;
   (d) covering the assembled tubes with a single length of electrically non-conductive, flexible tubing; and
   (e) clamping the flexible tubing about the rigid tubing.

16. The method of claim 15 wherein the step of covering the assembled rigid tubes is comprised of the steps of:
   (a) sealing one end of a length of flexible tubing;
   (b) inflating and thereby deforming the flexible tubing to a size at least the diameter of the rigid tubing;
   (c) removing the sealed end of the flexible tubing; and
   (d) sliding the deformed flexible tubing over the rigid tubing.

17. The method of claim 15 wherein the step of clamping the flexible tubing comprises the steps of:
   (a) heating the flexible tubing after it is positioned about the rigid tubing; and
   (b) cooling the flexible tubing whereby the tubing shrinks into tight fitting engagement with the rigid tubing.

18. The method of claim 15 including the step of sealing the conductive elements inside the flexible tubing.

19. The method of claim 15 including the steps of:
   (a) passing an elongated length of shielded wire through the assembled tubing whereby a first end of the elongated wire terminates in an area common with all the other shielded wires and the second end of the elongated wire extends past the end of the tubing; and
   (b) sealing the second end of the elongated wire in a liquid tight housing.

20. A capacitive probe for measuring the depth of a conductive liquid comprising:
   (a) a plurality of separable, electrically conductive probe sections;
   (b) electrically conductive connection means interposed between pairs of said probe sections to releasably join said probe sections in a particular sequence; and
   (c) a single length, electrically non-conductive casing enclosing said probes in the assembled condition in a tight fitting relationship.

21. The apparatus of claim 20 wherein said probe sections are rigid, hollow tubular members, said sections being threadably connected to each other by said connection means.

22. The apparatus of claim 20 including a plurality of rigid probe sections and one flexible probe section.

23. The apparatus of claim 20 wherein said casing is deformable.

24. The apparatus of claim 20 including clamping means arranged to retain said casing in tight fitting relationship about the ends of said probe sections in the assembled condition.

References Cited by the Examiner

UNITED STATES PATENTS

| | | | |
|---|---|---|---|
| 2,570,659 | 10/1951 | Fay | 317—246 X |
| 3,010,320 | 11/1961 | Sollecito | 317—246 X |
| 3,050,786 | 9/1962 | St. John | 264—30 X |
| 3,162,806 | 12/1964 | Voetter | 174—47 X |

FOREIGN PATENTS

| | | |
|---|---|---|
| 102,807 | 12/1937 | Australia. |
| 558,120 | 5/1958 | Canada. |

ROBERT K. SCHAEFER, *Primary Examiner.*

JOHN F. BURNS, *Examiner.*

E. GOLDBERG, *Assistant Examiner.*